Figure 1:
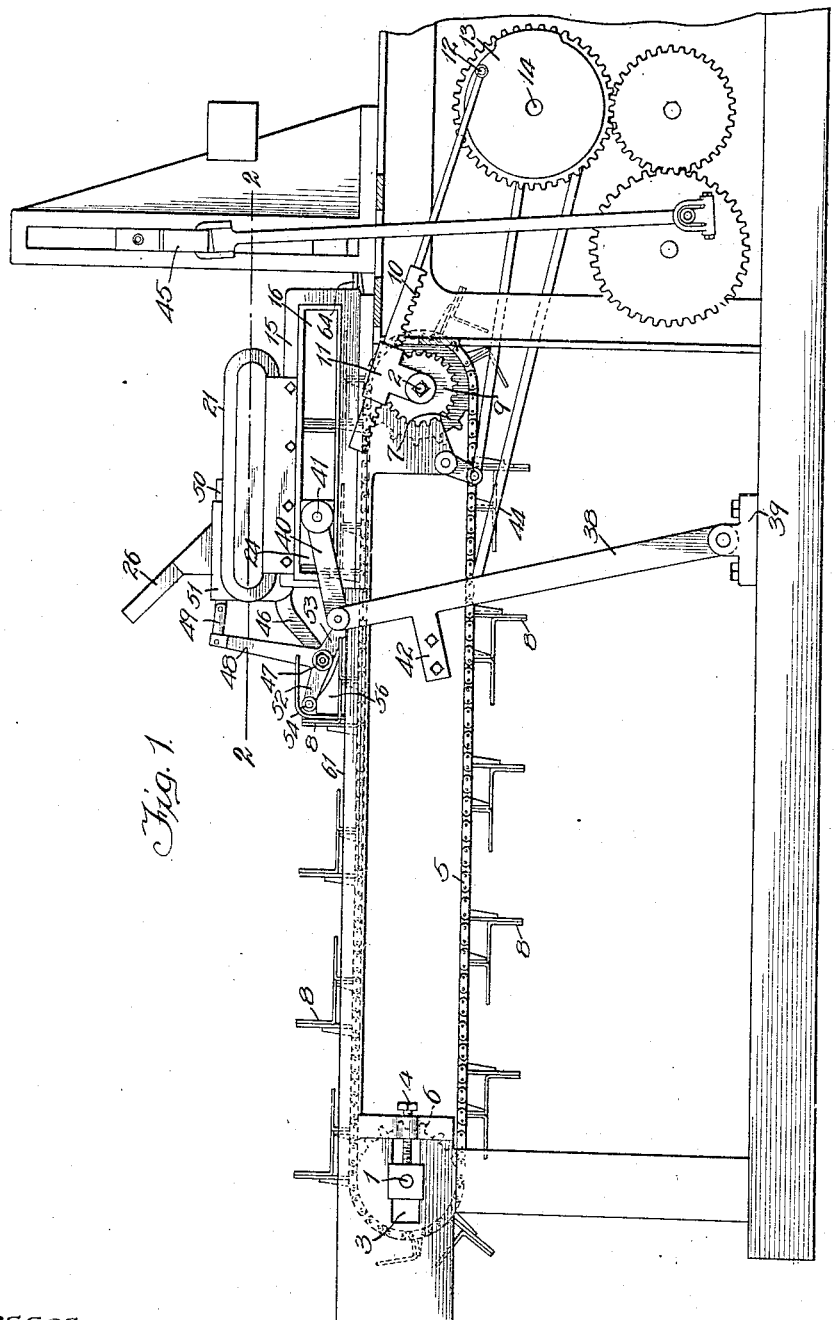
Figure 2:
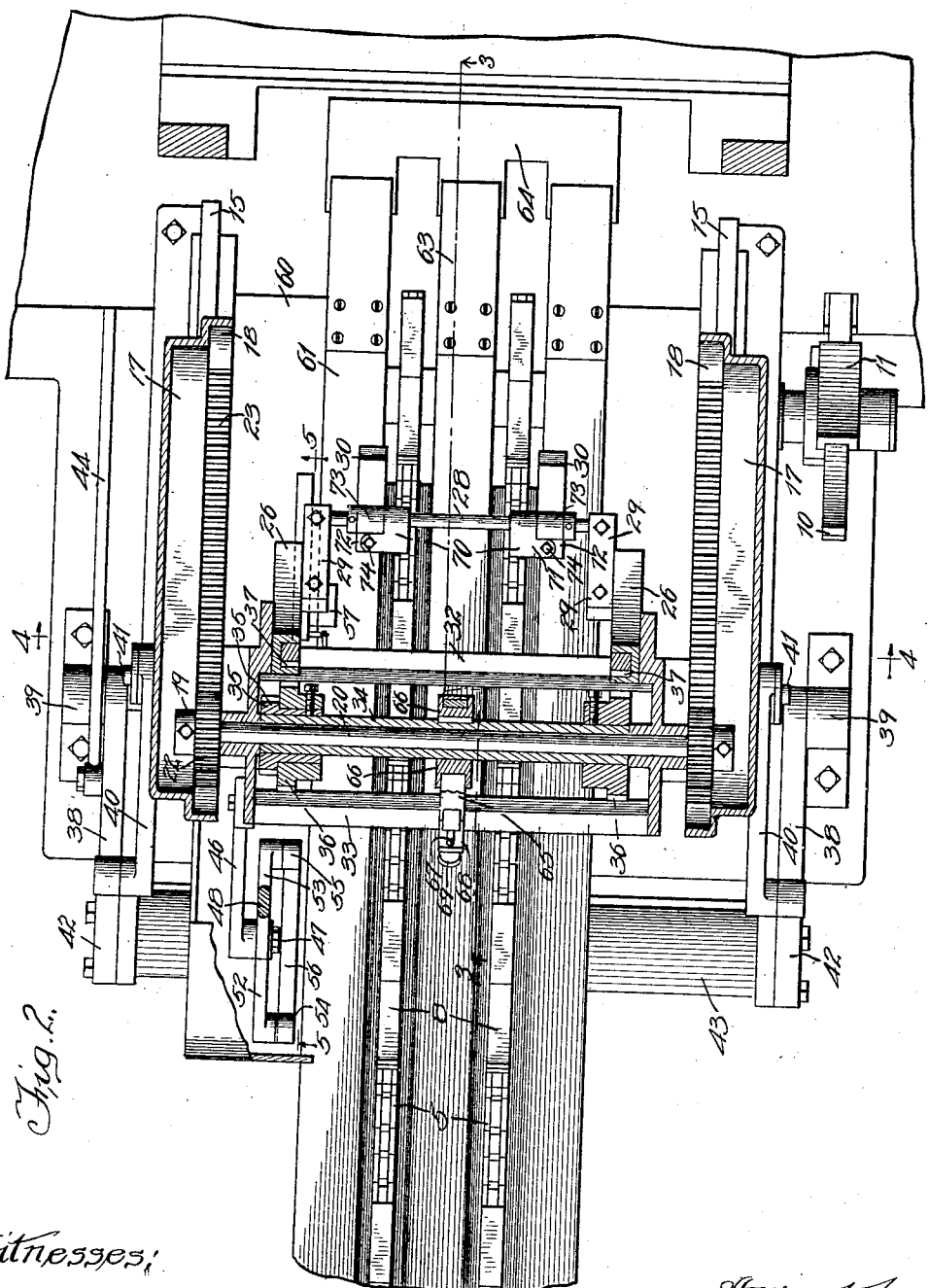
Figure 3:
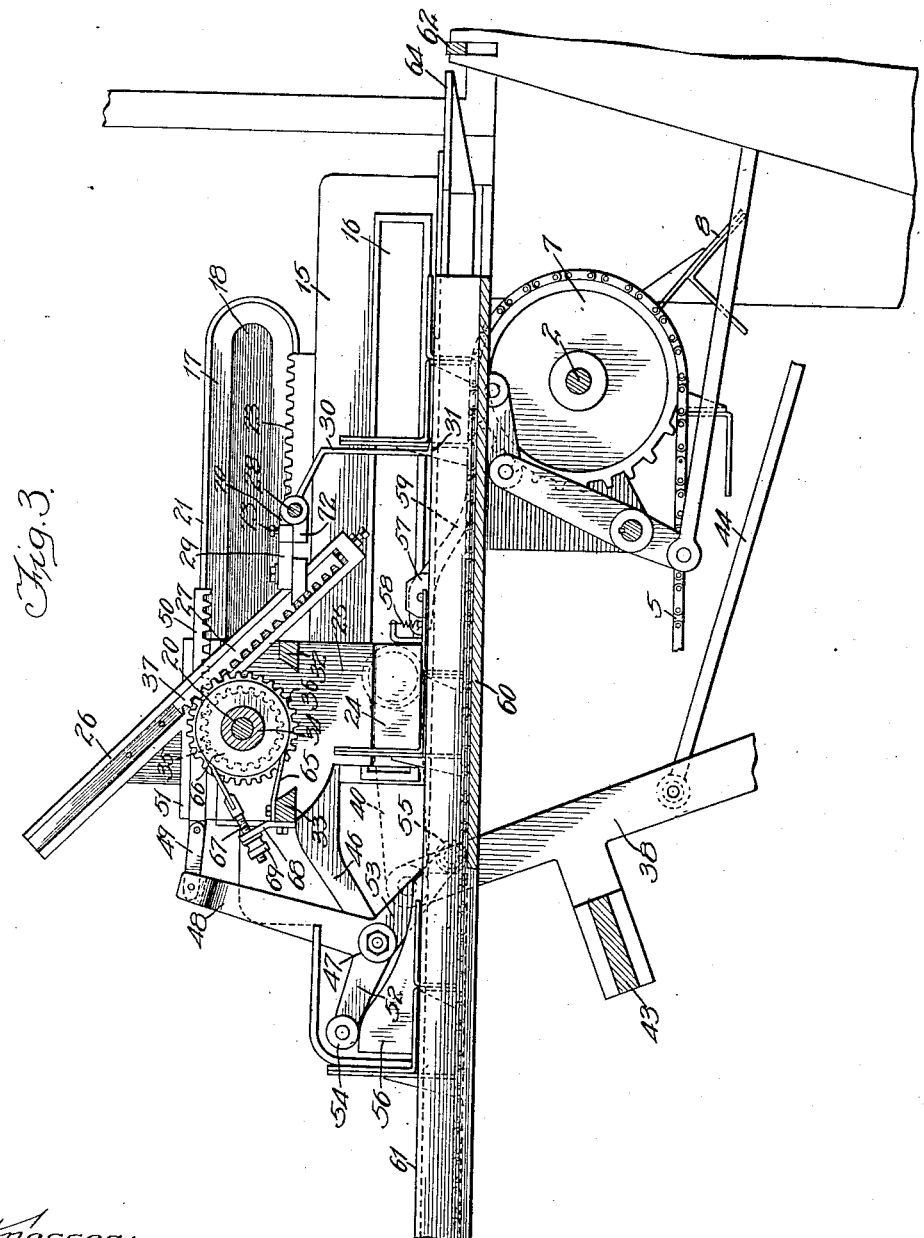
Figure 4:
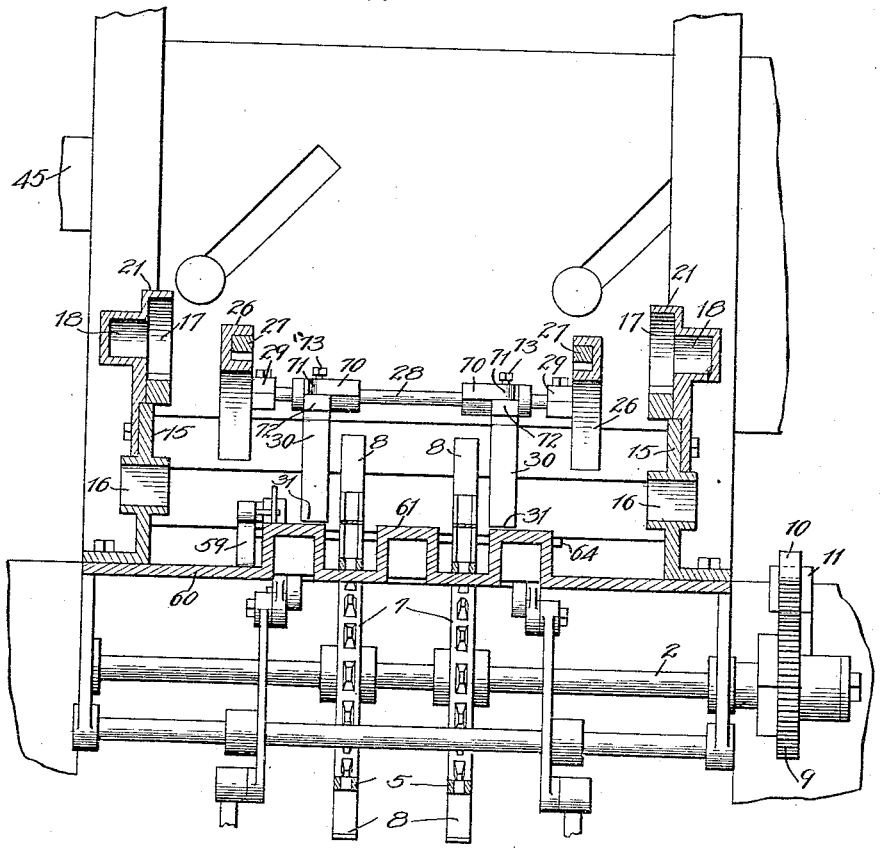
Figure 5:
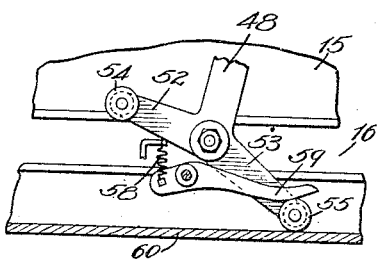

J. ROWE.
FEED ATTACHMENT FOR AUTOMATIC BOOK TRIMMING MACHINES.
APPLICATION FILED MAY 22, 1915.

1,213,265.

Patented Jan. 23, 1917.
4 SHEETS—SHEET 2.

Witnesses:
Arthur W. Carlson
Stephen Petora

Inventor:
James Rowe
By Rudolph, Jr.
Atty.

J. ROWE.
FEED ATTACHMENT FOR AUTOMATIC BOOK TRIMMING MACHINES.
APPLICATION FILED MAY 22, 1915.

1,213,265.

Patented Jan. 23, 1917.
4 SHEETS—SHEET 4.

Witnesses:

Inventor:
James Rowe
By Rudolph ... Atty.

UNITED STATES PATENT OFFICE.

JAMES ROWE, OF CHICAGO, ILLINOIS.

FEED ATTACHMENT FOR AUTOMATIC BOOK-TRIMMING MACHINES.

1,213,265.  Specification of Letters Patent.  Patented Jan. 23, 1917.

Application filed May 22, 1915. Serial No. 29,932.

*To all whom it may concern:*

Be it known that I, JAMES ROWE, a citizen of the United States, residing at Chicago, in the county of Cook and State of Illinois, have invented certain new and useful Improvements in Feed Attachments for Automatic Book-Trimming Machines; and I do hereby declare the following to be a full, clear, and exact description of the invention, such as will enable others skilled in the art to which it appertains to make and use the same.

This invention has for its object to provide a feed device for feeding book pads to automatic book trimming machines such as are described in Letters Patent to Thomas C. Welch, Nos. 1,003,679, dated Sept. 19, 1911, and 1,076,726, dated Oct. 28, 1913.

The invention has for its particular object to provide a feeder of the character specified which coacts with other feeding devices for bringing the books into the path thereof in such a manner as to maintain the travel of the books at a relatively constant speed from a point exterior of the trimming plane of the machine to that point intersected by the trimming plane at which the primary trimming operation takes place.

In the accompanying drawings illustrating a suitable embodiment of the invention: Figure —1— is a side elevation partly in section of the forward end portion of an automatic book trimming machine equipped with feed devices constructed in accordance with my invention. Fig. —2— is a horizontal section of the same on an enlarged scale on the line 2—2 of Fig. —1—, parts being broken away for want of space. Fig. —3— is a vertical longitudinal section of the same on the line 3—3 of Fig. —2—. Fig. —4— is a vertical transverse section of the same on the line 4—4 of Fig. —2—. Fig. —5— is a detail vertical longitudinal section on the line 5—5 of Fig. —2—.

In the operation of automatic book trimming machines it is very desirable that the operator be not required to place his hands at any time underneath the trimming knives as this is obviously extremely dangerous, and it is the purpose of this invention to provide means adapted to be supplied with book-pads at a point distant from the first trimming knife for carrying the said book pads into proper position with respect to the trimming plane of the first trimming knife of the machine whence it is automatically carried to the remaining trimming planes for trimming the three edges of the books. The said first trimming knife operates at regular intervals and the feed devices must, therefore, operate in synchronism therewith. This requires an intermittent movement of the book-pad carrier and the present feed device associated therewith for moving the book-pads into their final position relatively to the said trimming knife for trimming the front edges of the books. The purpose of this feed device is to deliver the book-pads successively against gages by means of which their proper position relatively to the trimming plane is determined. These gages are illustrated in the aforesaid patents and are omitted from illustration herein.

The main endless carrier upon which the book-pads are placed by the operator is provided with supports for such pads at intervals corresponding to the length of each movement of the carrier and this, for purposes of economy of space and elimination of undue speed and consequent jerk and jar on the machine, should be as short as possible.

In order that the feeder comprised in the present invention may operate successfully, no part thereof should be disposed at any time in the path of the book pads, and upon engaging the front edges of the latter preparatory to positioning the same against the aforesaid gages or in proper position relatively to the trimming plane; the movement imparted to the book-pads should be smooth and gradual and not sudden or jerky in order that the books piled upon each other may not be thrown out of their proper relative positions.

Hence, my invention has for its object to provide a feeder which will accomplish the foregoing desired results and avoid the objections indicated.

To this end the invention comprises a suitable framework on which the bearings for two shafts 1 and 2 are carried, the bearings for the shaft 1 being slidably mounted in suitable guides 3 and adapted to be adjusted by means of the set screw 4 to maintain taut parallel sprocket chains 5 trained over sprockets 6 and 7 on said shafts 1 and 2. The said sprocket chains are equipped at regular intervals with L-shaped supports 8 for book pads, said supports being substantially of the width of the chains and being disposed at regular intervals thereon so that the end portions of the book pads to be trimmed will rest upon said supports 8. Associated with said shaft 2 is a spur gear 9 which meshes with a reciprocable rack 10 slidable in a bearing or guide 11 pivoted on the shaft 2 and which is connected at its other end with the crank pin 12 on the gear 13 carried by one of the countershafts 14 of the machine. Said rack 10 is adapted to be reciprocated, its stroke being twice the radial distance of the crank axis 12 upon the axis of the shaft 14, and during each movement thereof in one direction the said gear 9 will be rotated in a direction to cause the book-supporting devices 8 disposed at the top of the machine to move forward the requisite distance. The rotation of the said gear in the opposite direction is free so as not to effect a reverse movement of the sprocket chains 5 as will be obvious. This is more particularly described in Letters Patent No. 1,118,152, issued to me Nov. 24, 1914, the operation of the sprocket wheel being in this instance substantially the same as described in the said Letters Patent.

Mounted on the frame of the machine on either side of the path of travel of the sprocket chains 5 are two opposed standards 15, each of which is provided with a longitudinal guide slot 16 horizontally disposed and contiguous to the connection of said standard with the frame of the machine. Supported on each standard is a guide member 17 provided with a longitudinal recess 18 in which the collar 19 at the end of a shaft 20 is adapted to travel. The said guide member 17 is equipped with a peripheral flange having parallel horizontal portions 21 between which the spur pinion 22 travels. The lower flange carries a rack 23 with which said spur pinion 22 meshes. Movable in said guide slots 16 in the standards 15 are the guide shoes 24 of a carriage 25 carrying the bearings for the said shaft 20 and which also carries other mechanism which will now be fully described. This comprises a pair of guide members 26 in which guide shoes 27 of a cross-bar 28 are reciprocably movable; said members 26 being disposed at an angle of forty-five degrees whereby to move said cross-bar 28 up and down relatively to the book pad supporting surfaces at said angle. Mounted on said cross-bar and connecting the same with said guide shoes are two plates or arms 29 which are of considerable length to cause said cross-bar to project a considerable distance forward of the plane of travel of said guide shoes. Mounted upon said cross-bar 28 are two pusher fingers 30 which project forward and downwardly from said cross-bar and are provided at their lower ends with projections 31 disposed in a plane slightly below the book supporting surfaces of the members 8, and which travel at either side of the path of travel of said sprocket chains 5, and engage the book pads carried by the latter. The side portions or members of the carriage are connected together by means of cross-bars 32 and 33 to render said carriage rigid, and between the bearings for the shaft 20 said carriage is equipped with a sleeve or hollow shaft 34. The latter is equipped at one end with a spur pinion 35 rigid therewith and at both ends with larger spur pinions or spur gears 36. The latter engage the rack bars 37 rigid with the guide shoes 27 movable in the guide members 26.

It will be observed that the spur pinions 22 meshing with the racks 23 serve only to prevent the carriage from being canted by irregularity in the drive at opposite sides thereof, the said carriage being reciprocated by means of levers 38 at opposite sides of the frame, which are pivotally mounted at their lower ends on a shaft journaled in bearings 39 on the base of the frame-work, and are connected at their upper ends by means of links 40 with the trunnions 41 on the guide shoes 24 of said carriage. Said levers or arms are equipped between their ends with projections 42 between which a cross-bar 43 is disposed, and to which the same is firmly secured. One of said levers or arms 38 is suitably connected by means of a connecting rod 44 with a rotatable member of the machine for rocking the same to impart reciprocatory motion to the carriage 25 at predetermined intervals in synchronism with the movements of the front trimming knife 45 of the machine. Said carriage is provided at one side with a rearwardly projecting arm 46 at the end of which a substantially T-shaped lever 47 is pivotally secured. The longer arm 48 of said lever projects upwardly and is connected by means of a link 49 with a rack bar 50 reciprocably mounted in suitable guides 51 in the side plates 25 of the carriage. The said rack bar 50 meshes with the said spur pinion 35 and as the lever 47 is oscillated rotates the sleeve 34 on said shaft 20. The two short arms 52 and 53 of said lever 47 are equipped at their ends with anti-friction rollers 54 and 55. The roller 54 is adapted to ride upon a cam member 56 at one end of the path of travel of said roller, said cam member being suitably shaped to cause said roller to turn said lever 47 in a direction to cause the rack bar 50 to be moved toward the trimming plane of the trimming knife 45 as the carriage approaches the rearward limit of its movement. Disposed in the path of travel of the anti-friction roller 55 is a pivoted cam member 57 which is normally held by means of the spring 58 to cause its longer or cam arm 59 to rest upon the bottom of a trough 60 between the standard 15 and the adjacent guide rail 61 of the machine. The pivoted end of the said cam member 57 is disposed at such an elevation as to permit the roller 55 to pass freely underneath the same when the carriage moves toward the forward limit of its movement, and during such travel said roller 55 will move said cam arm 59 out of its path. As soon, however, as the carriage makes its rearward stroke the said cam member will be so disposed in the path of the roller 55 as to force the latter to travel upwardly over the upper surface thereof and in so doing the said lever 47 will be turned in a direction to cause the rack bar 50 to be moved in the then direction of travel of the carriage relatively to the latter. During the first-named movement of the said lever 47 to the position shown in Fig. —3—, the spur gears 36 will move the guide shoes and the book pushers 30 to the position shown in Fig. —3—, the travel of said pushers being such as to cause the same to pass between contiguous book-pad supporting members 8 and between the book-pads supported thereon without coming in contact with either of the latter. As shown in Fig. —3— the vertical portions of the said pushers 30 will drop immediately behind the upwardly extending portions of one of the members 8, and at this time the carriage 25 will begin its forward movement; this movement being relatively gradual, but at higher speed than the movement in the same direction of the sprocket chain 5, thereby causing the pushers 30 to gently move the book pad forward at greater speed than the same is being carried by the sprocket chain. The said pushers thus move the book pad out of the path of the upwardly projecting portions of the members 8 as the latter turn downwardly following the movement of the sprocket chains over the wheels 7, such movement occurring between said sprocket wheels and the cutting bed 62 of the front trimming knife. After leaving said supporting members 8 the book pad is adapted to be supported upon or slide over the side rails 61 and a middle rail 63 between which and the side rails 61, the said sprocket chains travel, and over a plate 64 and over the cutting bed 62 against suitable gages for positioning the front edge portion of the book pad properly with relation to the trimming plane of the front trimming knife of the machine for properly trimming said front edge. As soon as the book pad has been thus positioned the carriage begins its rearward movement, and in order that the pusher fingers may not, during such movement, contact with the next succeeding book-pad to be delivered to the trimming knife, the said pushers must be raised at the beginning of the rearward movement of the carriage as will be obvious. At the initial portion of the rearward stroke of the carriage the anti-friction roller 55 on the arm 53 of the lever 47 will ride upon the cam face 59 of the cam member 57 thereby causing the rack bar 50 to be moved in a direction to rotate the sleeve or hollow shaft 34 to cause the rack bars meshing with the spur gears 36 to move to the upper limit of their movement, thereby raising the pushers 30 out of the path of the book pads, the same being returned into the path thereof when the carriage again reaches the position shown in Fig. —3—. It will be observed that the upward and downward movements of the pushers 30 occur only during the rearward movement of the carriage. During the downward movement thereof the carriage is still moving and its rearward movement relatively to the frame of the machine is practically equal to the length and speed of the forward or opposite movement of the vertical arms of the pushers so that the latter remains substantially in a fixed vertical plane during this movement. This is an essential feature of the present invention. In order that the said sleeve 34 may not rotate too freely and thus permit the pushers to drop back too soon to their lower position during the rearward movement of the carriage and after the roller 55 has passed over the said cam 57, I provide a brake of any suitable type for engaging said sleeve 34 and resisting the free rotation thereof. For this purpose I prefer to employ the well-known strap brake 65 which is secured at one end to the cross-bar 33, and is passed around a drum 66 rigid with the sleeve 34, and is connected at its other end with a threaded member 67 mounted for reciprocable movement in a projection or arm 68 on said cross-bar 33, and which is engaged by a thumb nut 69 for adjusting the tension of said brake on said drum 66.

It will be noted that the pushers 30 are made relatively light and are more or less yielding so that in the event that the book-pad should be of slightly greater average length or depth longitudinally of the machine than the minimum distance between the gages against which they are delivered by said pushers, and the forward limit of movement of the latter, said pushers may yield without injury to the mechanism or the books. The cross-bar 28 on which said pushers are pivotally mounted is provided with adjustable collars 70, each having an arm 71 extending parallel with the shaft 28 and which is disposed in the path of a projection 72 on the hub or collar 73 to which the pusher fingers are secured. Said arms 71 are equipped with set screws 74 for enabling the limit of pivotal movement of the said pushers in one direction to be adjusted in a well-known manner.

My invention is preferably embodied as herein shown and described, and it will be apparent that such embodiment is capable of modification without departing from the invention as defined in the appended claims.

I claim as my invention:

1. In a book-trimming machine, feed mechanism including a reciprocable member, book-pad engaging means carried thereby, and means for throwing the same out of and into engaging relation to book pads during movement of said member in one direction, and maintaining said means in said relation during the entire movement of said member in the opposite direction whereby the said engaging means are positioned to engage the book pads during the entire movement of the carriage in the opposite direction.

2. In a book-trimming machine, feed mechanism including a reciprocable carriage, a book-pad support between the limits of movement thereof, book pad engaging means on said carriage, and mechanism for raising and lowering the said means during the movement of said carriage in one direction for causing said means to pass freely over the book-pad to be moved thereby whereby the said engaging means are positioned to engage the book pads during the entire movement of the carriage in the opposite direction.

3. In a book-trimming machine, feed mechanism including a horizontally reciprocable carriage, a book-pad support between the limits of movement thereof, reciprocable book pad engaging means on said carriage, and mechanism for raising and lowering the said means during the backward movement of said carriage in one direction for causing said means to pass freely over the book-pad to be moved thereby.

4. In a book-trimming machine, feed mechanism including a horizontally reciprocable carriage, a book-pad support, book-pad engaging means on said carriage reciprocable relatively thereto to vary the elevation thereof, mechanism on said carriage for reciprocating said means as said carriage moves rearwardly, and devices on the frame of the machine adapted to be engaged by said mechanism to actuate the latter at predetermined intervals to cause said means to pass freely over and drop behind the book pad during the rearward movement of the carriage.

5. In a book-trimming machine, feed mechanism including a horizontally reciprocable carriage, a book-pad support, book-pad engaging means on said carriage reciprocable relatively thereto to vary the elevation thereof, mechanism on said carriage for reciprocating said means as said carriage moves rearwardly, and cams on the frame of the machine disposed in engaging relation to said mechanism to actuate the latter at predetermined intervals to cause said means to pass freely over and drop behind the book pad during the rearward movement of the carriage.

6. In a book-trimming machine, feed mechanism including a horizontally reciprocable carriage, a book-pad support, book-pad engaging means on said carriage reciprocable relatively thereto at an angle to vary the elevation thereof, mechanism on said carriage for reciprocating said means as said carriage moves rearwardly, and devices on the frame of the machine adapted to be engaged by said mechanism to actuate the latter at predetermined intervals to cause said means to pass freely over and drop behind the book pad during the rearward movement of the carriage, the angle of reciprocal movement of said means being adapted to cause the same to move downwardly without moving appreciably in the direction of travel of the carriage as the latter approaches the rearward limit of its movement.

7. In a book-trimming machine, feed mechanism including a horizontally reciprocable carriage, book-pad engaging means carried thereby, a book-pad support disposed between the limits of horizontal reciprocable movement of said means, and mechanism for imparting elevatory movement to said means to cause the latter to pass freely over the book-pad during the rearward movement of the carriage, said mechanism including means whereby the book-pad engaging means moves downwardly in a substantially fixed vertical plane while said carriage approaches the rearward limit of its movement.

8. In a book-trimming machine, feed mechanism including a horizontally reciprocable carriage, book-pad engaging means carried thereby, a book-pad support disposed between limits of horizontal reciprocable movement of said means, and mechanism for imparting elevatory movement to said means to cause the latter to pass freely over the book-pad during the rearward movement of the carriage, said mechanism including inclined guides for said book-pad engaging means, levers associated with the latter, and cams on the frame of the machine disposed in the path of and adapted to be engaged by said levers during the movement of said carriage in one direction, said angular guides adapted to cause a simultaneous downward and forward movement of said means as said carriage approaches the rearward limit of its movement, said forward movement being substantially the same in speed as said carriage, whereby said means drop practically vertically in proximity to the face of the book pad to be engaged thereby.

9. In a book-trimming machine, feed mechanism including a horizontally reciprocable carriage, book-pad engaging means carried thereby, a book-pad support disposed between the limits of horizontal reciprocable movement of said means, and mechanism for imparting elevatory movement to said means to cause the latter to pass freely over the book-pad during the rearward movement of the carriage, said mechanism including inclined guides rigid with the carriage, guide shoes rigid with said means movable in said guides, rack-bars rigid with said guide shoes, a rotatable shaft on the carriage equipped with spur-pinions meshing with said rack-bars, a spur-gear rigid with said shaft, a reciprocable rack-bar meshing therewith, a lever for reciprocating said rack-bar, cams on the frame of the machine, and projections on said lever adapted to engage said respective cams to rock said levers at intervals during rearward movement of said carriage to raise and lower said means.

10. In a book trimming machine, the combination with an intermittently movable carrier for book-pads to be trimmed, of mechanism associated therewith for delivering pads from the carrier to the trimming means, said mechanism including a reciprocable carriage, book-pad pushing devices carried thereby and adapted to be raised and lowered relatively thereto, mechanism on said carriage for raising and lowering the same, and means on the frame of the machine and coacting with the carriage actuating means for actuating said pushing devices at intervals to raise and lower the same out of and into engaging relation to the book-pads on said carrier.

11. In a book trimming machine, the combination with an intermittently movable carrier for book-pads adapted to bring the latter successively to a given point, of mechanism associated therewith for delivering pads from the said point to the trimming means, said mechanism including a reciprocable carriage, book-pad pushing devices carried thereby and adapted to be reciprocably raised and lowered relatively thereto, mechanism on said carriage for raising and lowering the same, and means on the frame of the machine and coacting with the carriage actuating means for actuating said pushing devices at intervals to raise and lower the same out of and into engaging relation to the book-pads on said carrier.

12. In a book trimming machine, the combination with an intermittently movable carrier for book-pads adapted to bring the latter successively to a given point, of mechanism associated therewith for delivering pads from the said point to the trimming means, said mechanism including a reciprocable carriage, book-pad pushing devices carried thereby and adapted to be reciprocably raised and lowered relatively thereto, mechanism on said carriage for raising and lowering the same, and means on the frame of the machine and coacting with the carriage actuating means for actuating said pushing devices at intervals to raise and lower the same out of and into engaging relation to the book-pads on said carrier, said pushing devices reciprocable at an angle of forty-five degrees more or less to the plane of travel of said carrier and adapted when lowered to move forward relatively to the carriage, and said actuating mechanism disposed to lower the same as said carriage approaches the rearward limit of its movement.

13. In a book-trimming machine, book-pad feeding means including a reciprocable member, a book-pad engaging the element carried thereby, a book-pad support disposed between the limits of movement of said element, and mechanism for effecting elevatory movement to said element at intervals during the reciprocal movement of said carriage in one direction, said mechanism including means for effecting downward movement of said element into engaging relation to the book-pad in a substantially fixed vertical plane.

14. In a book-trimming machine, book-pad feeding means including a reciprocable member, a book-pad engaging the element carried thereby, a book-pad support disposed between the limits of movement of said element, and mechanism for effecting elevatory movement to said element at intervals during the reciprocal movement of said carriage in one direction, said mechanism including a lever, a movable cam on the frame of the machine disposed to be engaged by said lever as the carriage moves in one direction to raise said element, and a fixed cam on the frame of the machine for engaging said lever as the carriage approaches the rearward limit of its movement to effect downward movement of said element.

In testimony whereof I have signed my name in presence of two subscribing witnesses.

JAMES ROWE.

Witnesses:
M. M. BOYLE,
IRVING COWLES.

Copies of this patent may be obtained for five cents each, by addressing the "Commissioner of Patents, Washington, D. C."